(12) United States Patent
Purnell

(10) Patent No.: US 6,190,440 B1
(45) Date of Patent: Feb. 20, 2001

(54) ODOR ABSORBING CONTAINER WITH AN ABSORBENT MATERIAL BETWEEN INNER AND OUTER CONCENTRIC WALLS

(76) Inventor: Gabriel L. Purnell, 9616 Mary Rd., Berlin, MD (US) 21811

(*) Notice: Under 35 U.S.C. 154(b), the term of this patent shall be extended for 0 days.

(21) Appl. No.: 09/267,106

(22) Filed: Mar. 12, 1999

(51) Int. Cl.⁷ .................................................. B01D 53/04
(52) U.S. Cl. ............................. 96/108; 96/147; 55/467; 55/517
(58) Field of Search ................... 55/515, 517, DIG. 17, 55/467; 96/108, 147

(56) References Cited

U.S. PATENT DOCUMENTS

| | | | |
|---|---|---|---|
| 2,001,828 | * 5/1935 | Smith | 96/147 |
| 2,080,066 | * 5/1937 | Sheppard et al. | 96/108 |
| 2,258,926 | * 10/1941 | Campbell | 55/517 |
| 2,770,317 | * 11/1956 | Bottum | 96/147 |
| 3,719,033 | 3/1973 | Den Boer | 55/387 |
| 3,739,558 | 6/1973 | Hurson | 55/387 |
| 4,793,837 | 12/1988 | Pontius | 55/316 |
| 4,858,561 | 8/1989 | Springer | 119/1 |
| 4,900,342 | 2/1990 | Spengler | 55/276 |
| 4,917,862 | 4/1990 | Kraw et al. | 422/4 |
| 5,169,528 | * 12/1992 | Karbachsch et al. | 55/517 |
| 5,224,975 | 7/1993 | Purnell et al. | 55/389 |
| 5,423,129 | * 6/1995 | Castle et al. | 34/80 |

* cited by examiner

Primary Examiner—David A. Simmons
Assistant Examiner—Robert A. Hopkins
(74) Attorney, Agent, or Firm—Roylance, Abrams, Berdo & Goodman, L.L.P.

(57) ABSTRACT

An air and water purifying device includes a housing having an annular space containing a suitable adsorbent or desiccant material. The housing includes an inner wall forming an axial passage and an outer wall and end caps closing the annular space. The inner and outer walls include a plurality of slots extending in a circumferential direction to allow the flow of water or air through the annular space in a radial direction. The end caps of the housing include a central opening aligned with the axial passage to allow the flow of air or water through the housing. The container enclosing the adsorbent can be supported in a housing to support the container and face the outer wall of the container from the walls of the housing to allow the flow of air around the container. The housing preferably includes at least one permeable wall to allow air to flow into the housing. End walls of the housing include openings aligned with the axial passage of the container to allow the flow of air through the adsorbent or desiccant material.

14 Claims, 3 Drawing Sheets

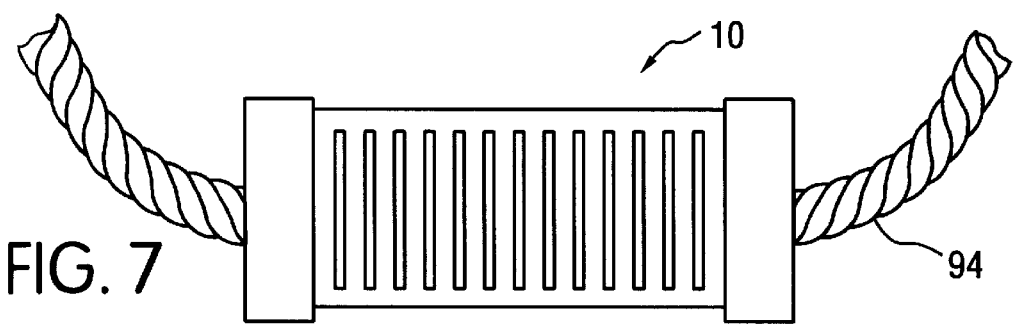
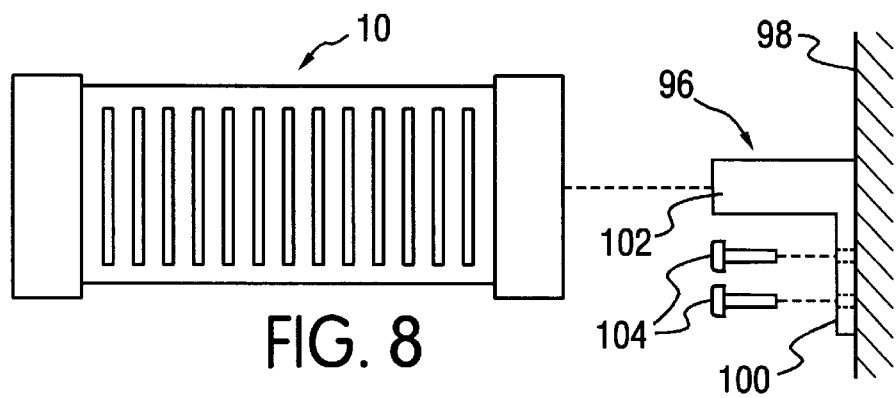
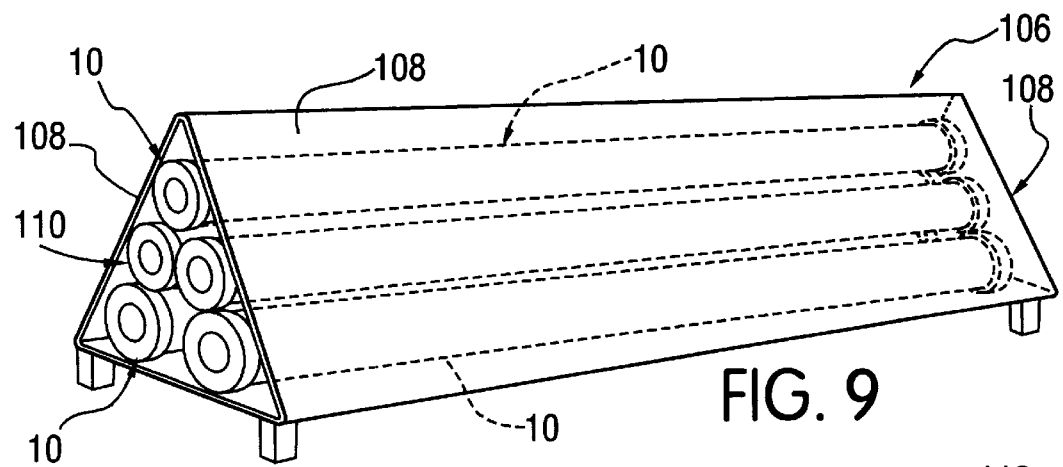
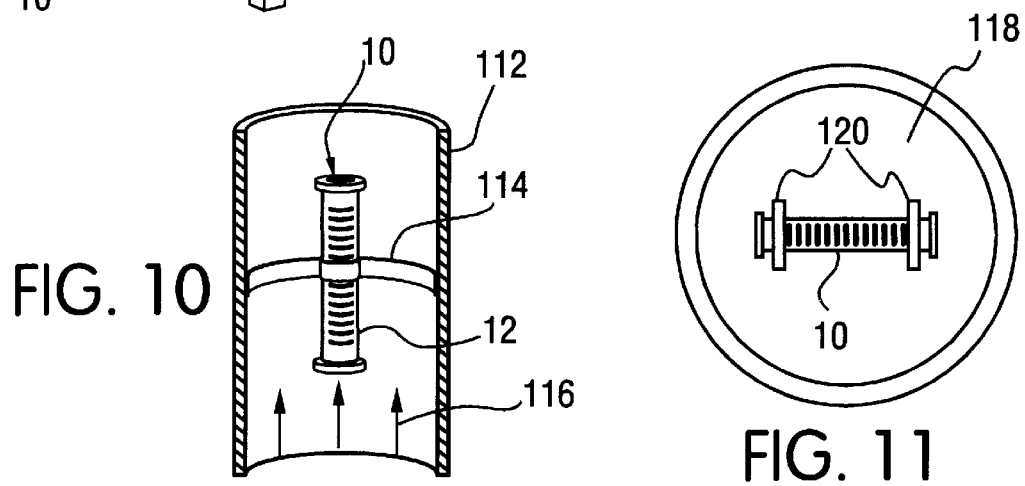

ODOR ABSORBING CONTAINER WITH AN ABSORBENT MATERIAL BETWEEN INNER AND OUTER CONCENTRIC WALLS

SUMMARY OF THE INVENTION

The present invention is directed to a container assembly containing an adsorbent material. More particularly, the present invention is directed to a container having a large surface area for enabling gases or liquids to pass through the adsorbent.

BACKGROUND OF THE INVENTION

A large amount of effort has been spent to control water and air pollution and has resulted in a number of devices and materials being produced. Noxious vapors and gases are a typical example of sources of air pollution which can make breathing difficult and unpleasant. To effectively clean air in large areas, mechanical filters and electronic cleaners are often used. These devices include air exchange filtration systems or electronically charged fields and plates to collect and remove particulate matter. The mechanical filters and electronic devices can be expensive to produce and require continuous maintenance thereby limiting their use. A further disadvantage of electronic air cleaners is that some of the devices produce ozone which is itself an air pollutant. Household odors such as cooking odors, pet odors and bathroom odors can be difficult to control. Numerous devices are presently on the market designed for deodorizing and freshening the air. These products are produced in many forms including, mist, blocks, liquids, powders and aerosol sprays. These products are generally effective for masking odors, but do not eliminate the odors or remove contaminants from the air.

Other solutions have been proposed to purify and freshen the air. For example, U.S. Pat. No. 1,737,532 discloses an air purifying and deodorizing device for use in refrigerators, toilets and sick rooms. A metallic container having a perforated surface and an adsorbent deodorizing material is placed within the area to be purified. The disclosed deodorizing material is a charcoal combined with other ingredients having germicidal qualities.

A further example of an air and water purifying device is disclosed in U.S. Pat. No. 5,224,975 to Purnell et al. This device is a canister having a perforated side wall and closed ends for containing a zeolite material. The canister has a limited number of openings for the exchange of air and water which limits its utility and effectiveness.

Accordingly, there is a continuing need in the industry for improved devices for purifying air and water.

SUMMARY OF THE INVENTION

The present invention is directed to a container for adsorbing contaminants from air or water, also acting as a desiccant. The invention is further directed to the combination of a housing having at least one permeable wall where the housing supports the container.

Accordingly, a primary aspect of the invention is to provide a method container for adsorbing odors and moisture from air and contaminants from water which is convenient and easy to use.

A further aspect of the invention is to provide a container enclosing an adsorbent material where the container has a porous inner and a porous outer surface.

Another aspect of the invention is to provide a container enclosing an adsorbent material having an axial passage through the container for the passage of air or water through an adsorbent contained within the container.

Another aspect of the invention is to provide a container enclosing an adsorbent material where the container has a large number of openings to allow the passage of air or water through the adsorbent.

A further object of the invention is to provide a method for removing odors and moisture from the air using an adsorbent in a container.

These and other aspects of the invention are basically attained by providing a device for removing contaminants from air or water where the device comprises an outer wall having a generally cylindrical shape with open first and second ends and a plurality of spaced apart open slots extending in a circumferential direction around the outer wall. The slots are of sufficient size to allow air or water to pass readily through the outer wall. An inner wall is mounted concentric with the outer wall and spaced therefrom to define an axial passage. The inner wall has a generally cylindrical shape with first and second open ends and a plurality of spaced apart open slots extending in a circumferential direction around the inner wall and being of sufficient size to allow the passage of air or water. An annular space is formed between the inner and outer walls and contains a particulate adsorbent material capable of removing contaminants from air or water. First and second end caps close the ends of the outer wall and the annular space. The end caps include a central opening aligned with the axial passage of the inner wall to allow the flow of air or water through the axial passage. In embodiments of the invention, the adsorbent material is a natural or synthetic zeolite.

The objects and advantages of the invention are further attained by providing an air purifying device for removing contaminants from the air comprising a housing having a top wall, a bottom wall, a rear wall, first and second end walls and a first and second support adjacent the end walls. A contaminant adsorbing container is positioned within the housing and supported by the first and second supports at the ends of the container. The supports space the container a distance from the top, bottom and rear walls of the housing to allow air circulation around the container. The container comprises a cylindrical outer wall having open ends and a plurality of spaced apart open slots extending in a circumferential direction around the outer wall where the slots are sufficient size to allow air to pass through the outer wall. A concentric inner wall is positioned within the outer wall to form an annular space between the walls. The inner wall defines an axial passage for the flow of air and includes, a plurality of spaced apart open slots extending in a circumferential direction around the inner wall. The slots in the inner wall are of sufficient size to allow air to pass through the inner wall. End caps are attached to the outer wall to close the annular space. The end caps include a central opening aligned with the axial passage of the inner wall to allow the flow of air through the container. An adsorbent material such as a zeolite is contained within the annular passage.

Other objects, advantages and salient features of the invention will become apparent from the following detailed description which discloses preferred embodiments of the present invention.

SUMMARY OF THE INVENTION

Referring to the drawings which form a part of this original disclosure, in which:

FIG. 7 is a side view of the container in a further embodiment showing a flexible cord extending through the axial passage for supporting the container;

FIG. 8 is a side view of the container in a further embodiment of the invention showing a hanger bracket extending into the axial passage of the container enclosing the adsorbent material;

FIG. 9 is a perspective view of a housing enclosing a cluster of the containers enclosing the adsorbent material;

FIG. 10 is a perspective view in partial cross-section showing the container mounted in a flu stack; and FIG. 11 is a bottom view of a trash can lid showing the container mounted to the bottom surface of the lid.

DETAILED DESCRIPTION OF THE INVENTION

Figure 1:
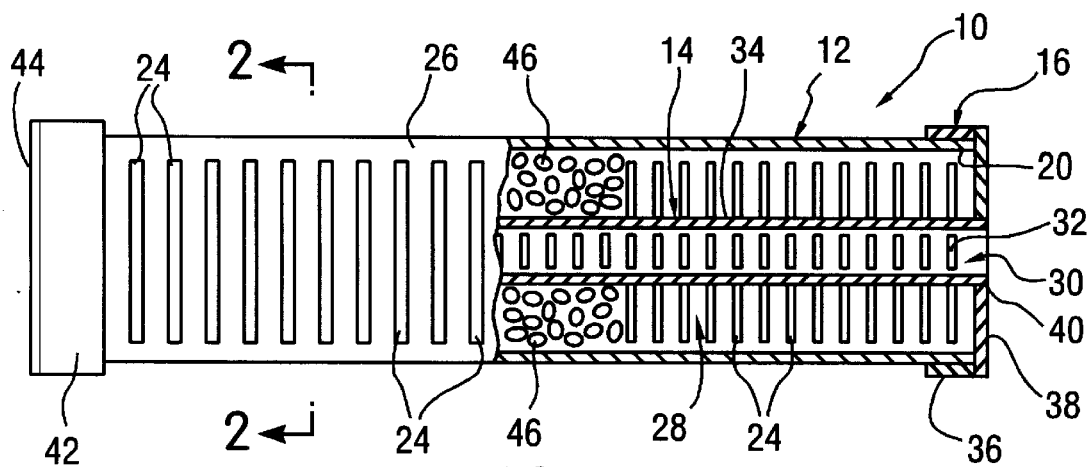
FIG. 1 is a side elevational view in partial cross-section of a first embodiment of the container in accordance with the invention.
Figure 2:
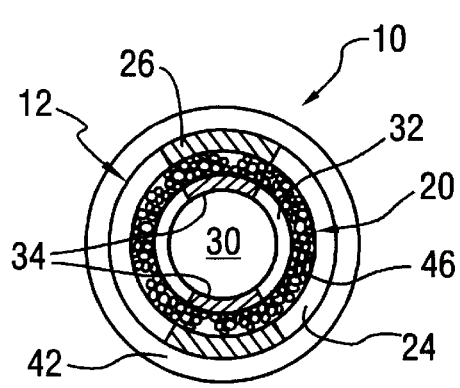
FIG. 2 is a cross-sectional view of the container taken along line 2—2 of FIG. 1.

The present invention is directed to a device for containing an adsorbent or desiccant material and to a method of adsorbing contaminants from air or water. Referring to FIGS. 1 and 2, a container 10 includes an outer wall 12, an inner wall 14 and end caps 16 and 18.

The outer wall 12 in a preferred embodiment of the invention is a substantially cylindrical tube having open ends 20. The outer wall can be made of plastic, metal or other suitable material. In preferred embodiments, the outer wall is a rigid plastic material made of polyvinyl chloride. The outer wall 12 includes a plurality of open slots 24 which are spaced apart along the length of the outer wall 12. The slots 24 are formed on opposite sides of the outer wall and extend in a substantially circumferential direction with respect to the outer wall. The slots 24 have a length and width to provide a maximum opening without sacrificing the structural integrity of the container 10. In the embodiment illustrated, the slots 24 on each side of the outer wall are aligned as shown in the cross-section of FIG. 2. A portion 26 of the outer wall 12 between the slots 24 does not contain openings to maintain the structural integrity of the outer wall 12. The adjacent slots 24 on each side of the outer wall 12 are spaced apart a distance to maximize the amount of open space in the outer wall while maintaining the structural integrity of the outer wall. The slots 24 generally provide about 40% to 60% open spaced based on the total surface of the outer wall.

Figure 2A:
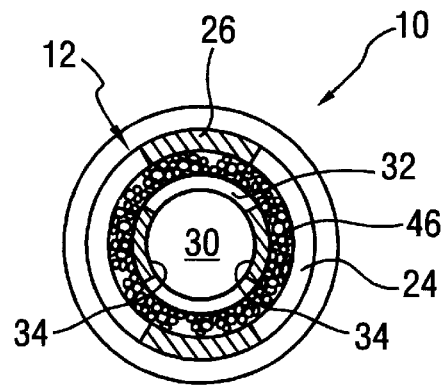
FIG. 2A is a cross-sectional view of the container in a further embodiment.

The inner wall 14 is constructed in a similar manner to the outer wall 12. The inner wall 14 has a substantially cylindrical shape and a length corresponding to the length of the outer wall 12. The inner wall 14 has a diameter less than the outer wall 12 and is positioned to be concentric with the outer wall 12 to form an annular space 28. The inner wall 14 has an axial passage 30 extending the length of the container 10. The inner wall 14 includes a plurality of spaced apart slots 32 which extend in a substantially circumferential direction with respect to the inner wall. In the embodiment illustrated in FIGS. 1 and 2, the slots 32 in the inner wall 14 have a width substantially equal to the width of the slots 24 in the outer wall and are aligned with each other. The slots 32 are formed on opposite sides of the inner wall and extend to a portion 34 without openings. In an alternative embodiment shown in FIG. 2A, the inner wall 14 is positioned within the outer wall 12 to position the slots 32 at substantially 90° to the slots 24 in the outer wall. The slots 32 generally provide about 40% to 60% open space based on the total surface area of the inner wall.

Referring to FIG. 1, end cap 16 includes a cylindrical wall portion 36 which fits over the outer surface of outer wall 12. The outer wall 36 of end cap 16 can be a friction fit or can be attached to the outer wall 12 by a suitable adhesive. An end wall 38 is attached to the cylindrical wall 36 to close the end of the outer wall 12. In the embodiment of FIG. 1, the end wall 38 has a central opening 40 which is aligned with the axial passage 30 of the inner wall 14 so that the axial passage 30 is open to the atmosphere. In the embodiment illustrated, the inner wall 14 has a length to extend through the central opening 40 in the end wall 38 such that the inner wall is supported by the end wall 38. The inner wall 14 is attached to the end wall 38 at the central opening by a suitable adhesive or other bonding system.

End cap 18 is similar to end cap 16 and includes an outer cylindrical side wall 42 which fits over the end of the outer wall 12. An end wall 44 is attached through the side wall 42 to close the end of the outer wall 12. The end wall 44 can include a central opening aligned with the inner wall 14 to open the axial passage 30 to the atmosphere. In a similar manner as in the end cap 16, the inner wall 14 can have a length to extend through the central opening and be mounted and supported by the end wall 44. In an alternative embodiment, the end wall 44 can close the end of the inner wall 16 such that the axial passage 30 is open at one end of the container 10.

In preferred embodiments of the invention, the end walls 44 and 38 have an opening to the axial passage 30 to allow the flow of air or water through the container 10. In use, air or water can flow freely through the slots 24 in the outer wall and through the annular space 28 through the slots 32 in the inner wall.

The annular space 28 is filled with a particulate adsorbent or desiccant material 46. In preferred embodiments, the adsorbent is a naturally occurring zeolite having a particulate size larger than the dimension of the slots 24 and 32 so that the adsorbent is retained in the annular space 28. The adsorbent is packed into the annular space at a density to provide maximum adsorption while allowing the flow of air or water through the annular space 28 in a radial direction. In further embodiments, the adsorbent can be activated charcoal, synthetic zeolites, alumina and other adsorbent materials capable of adsorbing moisture from the air and adsorbing various contaminants from air or water.

In preferred embodiments, the adsorbent material is a zeolite having a particle size greater than the dimension of the openings in the inner and outer walls. Various zeolites can be used, such as, for example, clinoptilite, mordanite, chabazite and phillipsite. Zeolites are preferred due to the high adsorption capacity.

Zeolites have the advantage in that they can be placed in the sun or other heated area to drive off the adsorbed contaminants and moisture so that the zeolite can be reused.

Alternatively, the zeolite can be washed with a suitable material capable of displacing the adsorbed materials on the zeolite. The invention is particularly suitable for removing ammonia from air or water such as fish ponds, fish tanks, ponds and other bodies of water. The device can be used in poultry houses to remove ammonia and other harmful gases. Heavy metals can be removed from sludge, waste water systems, irrigation systems and the like.

Figure 3:
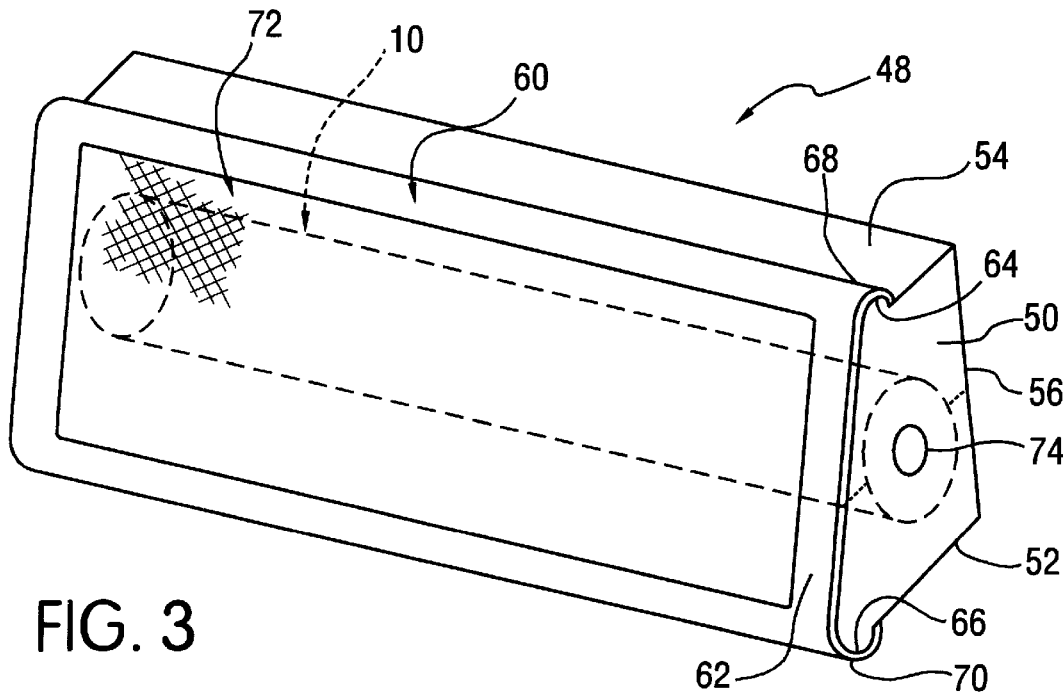
FIG. 3 is a perspective view of the housing containing the container enclosing the adsorbent material.
Figure 4:
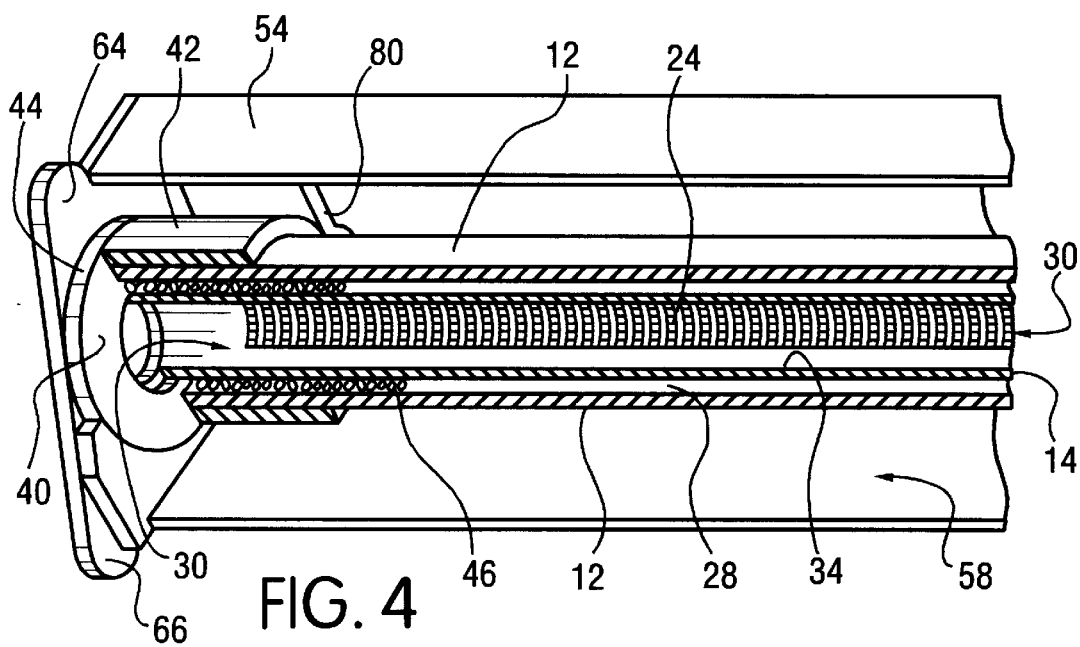
FIG. 4 is a partial cross-sectional view of the container enclosing the adsorbent material mounted within the housing with the front cover of the housing removed.
Figure 5:
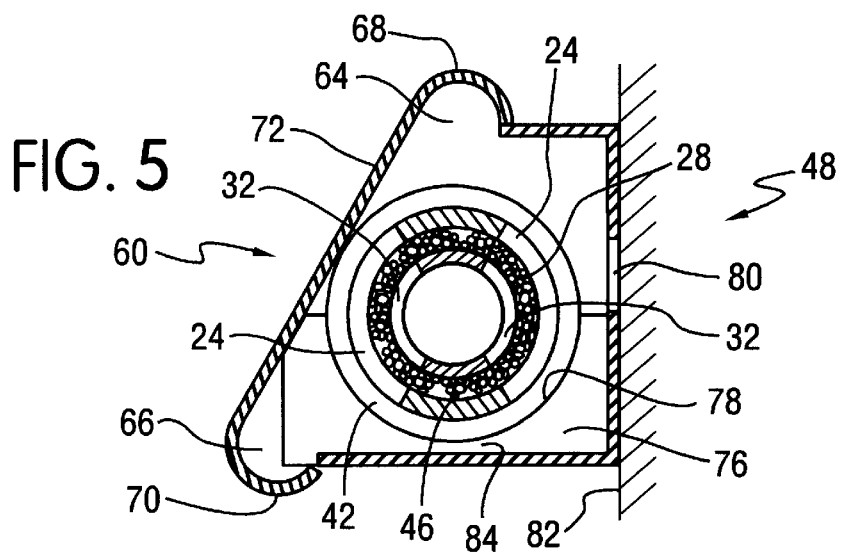
FIG. 5 is a cross-sectional view of the housing supporting the container enclosing the adsorbent material.

Referring to FIGS. 3–5, the container 10 is supported within a housing 48 for treating air to remove contaminants from the air. The housing 48 includes end walls 50, a bottom wall 52, a top wall 54 and a rear wall 56. The housing 48 has an open front face 58 which is generally closed by a removable grill 60. The removable grill in the embodiment shown has a frame 62 which is able to snap over the ends 64 and 66 of the end walls 50 of the housing 48. In the embodiment illustrated, the longitudinal edges of the frame 62 have curved sections 68 and 70 to snap over the end 64 and 66 to close the front opening 58 of the housing 48. An air permeable screen or grill 72 is provided in the center portion of the frame 62 to allow the flow of air through the open front end of the housing 48 to the container 10 supported within the housing.

The end walls 50 of the housing 48 as shown in FIGS. 4 and 5 is substantially flat and close the ends of the housing 48. In preferred embodiments of the invention, the end walls 50 include a central opening 74 to align with the axial passage 30 of the container 10 to allow the flow of air through the axial passage. A support bracket 76 is attached to each end wall 50. The support 76 includes an arcuate shaped recess 78 for receiving and supporting the container 10 so that the container 10 is spaced from the bottom wall 52, top wall 54 and rear wall 56. The rear wall 56 can include a slot 80 having a generally key hole shape for hanging the housing on a wall or other support surface 82. In use, the housing 48 is placed in the environment where the air is to be cleaned. Air flows through the axial passage 30 through the opening 74 in the end wall and radially through the adsorbent material 46 contained in the annular space 28 and through the air permeable screen 72. The air is able to pass through the adsorbent material in an outward and inward radial direction where odor, moisture and other contaminants are adsorbed by the adsorbent material.

Figure 6:
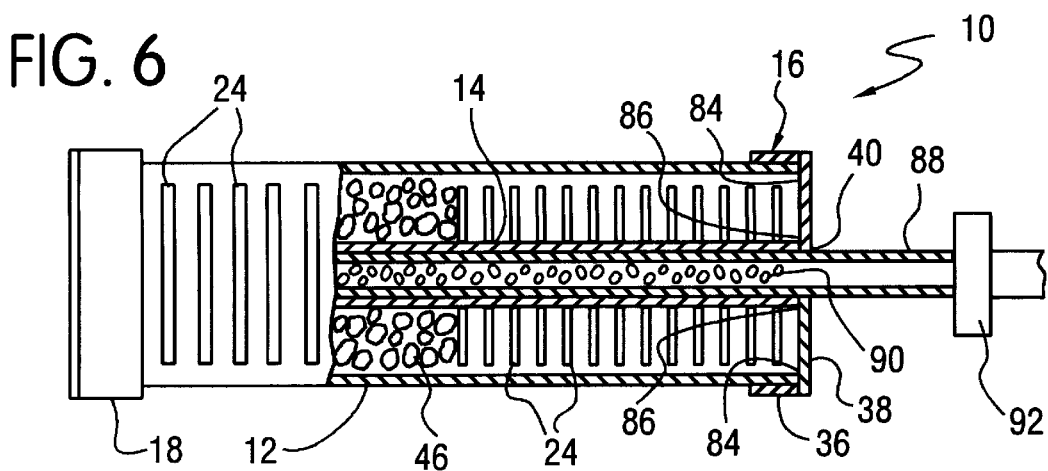
FIG. 6 is a side elevational view and partial cross-section showing a further embodiment of the invention including a flexible tube for supplying water or air to the axial chamber of the container enclosing the adsorbent material.

In a further embodiment shown in FIG. 6, the container 10 is substantially the same as the container of FIG. 1. In this embodiment, the central opening 40 of end wall 38 is dimensioned to correspond to the radial dimension of the axial passage 30 of the inner wall 14. The end of the inner wall 14 is attached to the end wall 36. An optional supporting ring 84 is positioned between the inner wall 14 and the outer wall 12 to support the inner wall in a fixed position. The annular support 84 has an outer edge attached to the inner surface of the outer wall 12 and an opening 86 having an inner surface attached to the outer surface of the inner wall 14 as shown in FIG. 6. A section of tubing 88 extends through the axial passage 30 of the inner tube and includes a plurality of outlet openings 90 extending along the length of the tube 88 positioned within the axial passage 30. In the embodiment illustrated, the tubing 88 is preferably a flexible plastic tubing material which is connected to a suitable pump 92 for feeding water or air to the axial passage 30. In this embodiment, the end cap 18 preferably closes the end of the container and closes the end of the axial passage 30 whereby the water or air injected through the tubing 88 passes radially outward through the adsorbent material 46 contained within the annular space 28.

FIGS. 7–11 illustrate various embodiments of the invention during use. In each of these embodiments, the container 10 is substantially the same as the container of FIG. 1. Referring to FIG. 7, the container 10 includes a flexible cord or rope 94 extending through the axial passage for supporting the container. Preferably, the cord 94 has a diameter less than the diameter of the axial passage 30 of the inner wall 14 to allow the flow of air through the axial passage 30. The ends of the cord 94 can be tied together to form a continuous loop or can be attached to an other support surface capable of supporting the container.

In the embodiment of FIG. 8, the container 10 is attached to a substantially L-shaped bracket 96 which is attached to a wall 98 or other support surface. The bracket 96 in the embodiment illustrated includes a base portion 100 and a leg 102 extending substantially perpendicular to the base 100. The leg 102 has a dimension to fit within the axial passage 30 to support the container 10. The leg 102 can be round, square or rectangular shape. The base 100 can be attached to the wall 98 by screws, nails or other suitable fasteners.

FIG. 9 illustrates a housing assembly containing a plurality of the containers 10 stacked together such that the containers are substantially parallel with each other. In the embodiment illustrated, the housing 106 of FIG. 9 includes side walls 108 and open ends 110. The side walls 108 can be solid or permeable to allow the flow of air through the walls to the containers 10. The side walls 108 preferably have a length corresponding to the length of the container 10. The containers 10 are stacked on top of each in a manner to maximize air flow through the housing. The end caps 16 and 18 of the containers 10 have a radial dimension slightly greater than the radial dimension of the outer wall 12 such that the containers can be stacked without the outer walls 12 contacting an adjacent container. In this manner, a space is provided between the outer walls 12 of adjacent containers to allow air circulation. In the embodiment illustrated, the housing 106 has a substantially triangular shape. In further embodiments, the housing can be square, rectangular or circular in cross-section.

FIG. 10 illustrates a further use of the container 10 positioned in a flue pipe 112. In the embodiment illustrated, the container 10 is supported by a bracket 114 to position the container 10 in the center of the flue pipe 12 and oriented in the axial direction with respect to the flue pipe 112. In this manner, flue gases indicated by arrows 116 flow in the axial direction with respect to the container 10 such that the gases are able to flow through the axial passage and flow through the inner wall 14 and the outer wall 12 of the container 10.

In a further embodiment, the container 10 is attached to the inner surface of a trash can lid 118 by a pair of U-shaped brackets 120. Preferably, the container 10 is removable from the brackets for replacing and recharging the adsorbent material.

While various advantageous embodiments have been disclosed to illustrate the invention, it will be understood by those skilled in the art that various changes and modifications can be made therein without departing from the scope of the invention as defined in the appended claims.

What is claimed is:

1. A purifying device for removing contaminants from air or water comprising:
    an outer wall having a generally cylindrical shape with open first and second ends, and having a plurality of open slots extending in a circumferential direction around said outer wall and space apart along a longitudinal direction of said outer wall, said slots being of sufficient size to allow air or water to pass through said outer wall;

an inner wall concentric with and spaced inwardly from said outer wall and defining an axial passage, said inner wall having a generally cylindrical shape with a first open end and a second open end, and having a plurality of spaced apart open slots extending in a circumferential direction around said inner wall, said slots being of sufficient size to allow air or water to pass through said inner wall, said inner wall being spaced from said outer wall a distance to define an annual space therebetween;

a first end cap having an end plate coupled to and closing said first end of said outer wall and having a center opening in said end plate adjacent said first open end of said inner wall;

a second end cap having an end plate and closing said annular space at said second end of said outer wall;

a particulate adsorbent material contained in said annular space and having a particle size greater than a width of said slots in said outer and inner walls and a flexible cord member extending completely through said axial passage of said inner wall for hanging said device.

2. The device of claim 1, wherein said end plate of said second end cap has a center opening adjacent said second open end of said inner wall.

3. The device of claim 1, wherein said end plate of said second end wall closes said second open end of said inner wall.

4. The device of claim 1, wherein said end plate of said second end cap includes an opening adjacent said second open end of said inner wall, and wherein said inner wall extends through said opening in said first and second end plates and said inner wall being supported by said end plates.

5. The device of claim 1, wherein said first end cap includes a cylindrical wall coupled to said end plate and to said first end of said outer wall, and said second end cap includes a cylindrical wall coupled to said end plate and to said second end of said outer wall.

6. The device of claim 1, further comprising a hanger having a first leg extending axially into said axial passage of said inner wall a distance sufficient to support said inner and outer walls and having a second leg for attaching to a support surface.

7. The device of claim 1, wherein said inner and outer walls are at about 40% to 60% open space defined by said slots, based on the total surface area of said inner and outer walls.

8. A purifying device comprising:

an outer wall having a generally cylindrical shape with open first and second ends, and having a plurality of open slots extending in a circumferential direction around said outer wall and space apart along a longitudinal direction of said outer wall, said slots being of sufficient size to allow air or water to pass through said outer wall;

an inner wall concentric with and spaced inwardly from said outer wall and defining an axial passage, said inner wall having a generally cylindrical shape with a first open end and a second open end, and having a plurality of spaced apart open slots extending in a circumferential direction around said inner wall, said slots being of sufficient size to allow air or water to pass through said inner wall, said inner wall being spaced from said outer wall a distance to define an annual space therebetween;

a first end cap having an end plate coupled to and closing said first end of said outer wall and having a center opening in said end plate adjacent said first open end of said inner wall;

a second end cap having an end plate and closing said annular space at said second end of said outer wall;

a particulate adsorbent material contained in said annular space and having a particle size greater than a width of said slots in said outer and inner walls; and a flexible tube concentric with said inner wall and being positioned in and contacting an inner surface of said inner wall, said flexible tube having a plurality of fluid outlet openings adjacent said inner surface of said inner wall, and a pump for supplying a source of air or water through said annular space from said slots in said inner wall outwardly through said slots in said outer wall.

9. An air purifying device for removing contaminants from the air, comprising a housing having a top wall, a bottom wall, a rear wall, first and second end walls, and first and second supports adjacent said end walls; and a contaminant adsorbing container supported at first and second ends by said first and second supports, said supports spacing said contaminant adsorbing container from said top, bottom and rear walls a distance to allow air circulation around said container, wherein said container comprises an outer wall having a generally cylindrical shape with open first and second ends, and having a plurality of spaced apart open slots extending in a circumferential direction around said outer wall, said slots being of sufficient size to allow air or water to pass through said outer wall;

an inner wall concentric with and spaced inwardly from said outer wall and defining an axial passage, said inner wall having a generally cylindrical shape with a first open end and a second open end, and having a plurality of spaced apart open slots extending in a circumferential direction around said inner wall, said slots being of sufficient size to allow air or water to pass through said inner wall, said inner wall being spaced from said outer wall a distance to define an annual space therebetween;

a first end cap having an end plate coupled to and closing said first end of said outer wall and having a center opening in said end place adjacent said first open end of said inner wall;

a second end cap having an end plate and closing said annular space at first end of said outer wall, and having a center opening in said end plate adjacent said second of said inner wall;

a particulate adsorbent material contained in said annular space and having a particle size greater than a width of said slots in said outer and inner walls; and an air permeable front wall removably coupled to said housing.

10. The device of claim 9, wherein said first and second end walls include an opening adjacent said open ends of said inner wall to allow the passage of air through said axial passage of said inner wall.

11. The device of claim 9, wherein said end plate of said second end wall includes an opening adjacent said second open end of said inner plate, and wherein said inner wall extends through said opening in said first and second end walls, said inner wall being supported by said end plates.

12. The device of claim 9, wherein said first end cap includes a cylindrical wall coupled to said end plate and to said first end of said outer wall, and said second end cap includes a cylindrical wall coupled to said end plate and to said second end of said outer wall.

13. The device of claim 9, wherein said inner and outer walls are at about 40% to 60% open space defined by said slots, based on the total surface area of said inner and outer walls.

14. An air purifying device comprising a housing having a top wall, a bottom wall, a rear wall, first and second end walls, and first and second supports adjacent said end walls; and a contaminant adsorbing container supported at first and second ends by said first and second supports, said supports spacing said contaminant adsorbing container from said top, bottom and rear walls a distance to allow air circulation around said container, wherein said container comprises an outer wall having a generally cylindrical shape with open first and second ends, and having a plurality of spaced apart open slots extending in a circumferential direction around said outer wall, said slots being of sufficient size to allow air or water to pass through said outer wall;

an inner wall concentric with and spaced inwardly from said outer wall and defining an axial passage, said inner wall having a generally cylindrical shape with a first open end and a second open end, and having a plurality of spaced apart open slots extending in a circumferential direction around said inner wall, said slots being of sufficient size to allow air or water to pass through said inner wall, said inner wall being spaced from said outer wall a distance to define an annual space therebetween;

a first end cap having an end plate coupled to and closing said first end of said outer wall and having a center opening in said end place adjacent said first open end of said inner wall;

a second end cap having an end plate and closing said annular space at first end of said outer wall, and having a center opening in said end plate adjacent said second of said inner wall;

a particulate adsorbent material contained in said annular space and having a particle size greater than a width of said slots in said outer and inner walls;

wherein said first and second supports are coupled to said end walls and include an arcuate recess for supporting said container.

* * * * *